US011425183B2

(12) United States Patent
Dwivedi et al.

(10) Patent No.: US 11,425,183 B2
(45) Date of Patent: Aug. 23, 2022

(54) MULTI-THREADED DATA TRANSFER TO MULTIPLE REMOTE DEVICES USING WIRELESS HART PROTOCOL

(71) Applicant: Eaton Intelligent Power Limited, Dublin (IE)

(72) Inventors: Akhil Aishwarya Dwivedi, Pune (IN); Rohit Ramchandra Deshpande, Pune (IN); Abhijit Gundawar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/890,754

(22) Filed: Jun. 2, 2020

(65) Prior Publication Data

US 2020/0389511 A1   Dec. 10, 2020

Related U.S. Application Data

(60) Provisional application No. 62/858,519, filed on Jun. 7, 2019.

(51) Int. Cl.
  *H04L 65/65* (2022.01)
  *H04L 65/61* (2022.01)
  *H04L 65/60* (2022.01)

(52) U.S. Cl.
  CPC ........ *H04L 65/608* (2013.01); *H04L 65/4069* (2013.01); *H04L 65/605* (2013.01)

(58) Field of Classification Search
  CPC .. H04L 65/608; H04L 65/4069; H04L 65/605
  USPC ....................................................... 709/231
  See application file for complete search history.

(56) References Cited

U.S. PATENT DOCUMENTS 7,620,685 B2 * 11/2009 Marcjan ............... G06F 21/606
                                                                709/204
7,899,897 B2 *  3/2011 Benhase ............. H04L 41/0659
                                                                709/223
8,813,139 B2 *  8/2014 Jeffs .................... H04N 7/17327
                                                                  725/86

(Continued)

OTHER PUBLICATIONS

Authoritative Dictionary of IEEE Standard Terms 477 (def. 2B) (7th ed. 2000) (Year: 2000).*

(Continued)

*Primary Examiner* — David P Zarka
(74) *Attorney, Agent, or Firm* — Talem IP Law, LLP (57) ABSTRACT

Systems and method for data transfer using, e.g., the Wireless HART protocol. A method includes the following steps. Reading the packetized data file having a stream of packets. Using a first thread of execution to send the stream of packets to a first device of the multiple remote devices. Using a second thread of execution to send the stream of packets to a second device of the multiple remote devices concurrent to using the first thread of execution. A server includes one or more processors. The one or more processors are used for performing the following steps. Packetizing the data file into a stream of packets. Using a first thread of execution to send the stream of packets to a first device of the multiple remote devices. Using a second thread of execution to send the stream of packets to a second device of the multiple remote devices concurrent to using the first thread of execution.

21 Claims, 4 Drawing Sheets

(56) References Cited

U.S. PATENT DOCUMENTS

| | | | | |
|---|---|---|---|---|
| 8,832,705 | B1* | 9/2014 | Berde | G06F 9/526 |
| | | | | 718/104 |
| 8,966,354 | B2* | 2/2015 | Morikawa | H03M 9/00 |
| | | | | 714/807 |
| 8,997,085 | B2* | 3/2015 | Cross | G06F 8/658 |
| | | | | 717/170 |
| 9,549,024 | B2* | 1/2017 | Leekley | H04L 67/1063 |
| 9,836,516 | B2* | 12/2017 | Quakkelaar | G06F 16/27 |
| 10,536,444 | B2* | 1/2020 | Weerasuriya | H04L 63/08 |
| 10,693,816 | B2* | 6/2020 | Guo | G06F 9/54 |
| 2008/0189693 | A1 | 8/2008 | Pathak | |
| 2009/0150878 | A1* | 6/2009 | Pathak | G06F 8/65 |
| | | | | 717/172 |
| 2013/0254248 | A1* | 9/2013 | Chang | H04L 67/101 |
| | | | | 707/827 |
| 2016/0025765 | A1* | 1/2016 | Panther | G01P 15/00 |
| | | | | 702/150 |
| 2016/0042065 | A1* | 2/2016 | Basso | H04N 21/235 |
| | | | | 725/53 |
| 2016/0110810 | A1* | 4/2016 | Ashok | G06F 16/9535 |
| | | | | 705/36 R |
| 2018/0025304 | A1 | 1/2018 | Fisher | |

OTHER PUBLICATIONS

European Patent Office (ISA/EP), International Search Report/ Written Opinion regarding PCT International Application No. PCT/EP2020/025265, completed Jul. 15, 2020 (dated Jul. 23, 2020).

* cited by examiner

MULTI-THREADED DATA TRANSFER TO MULTIPLE REMOTE DEVICES USING WIRELESS HART PROTOCOL

CROSS-REFERENCE TO RELATED APPLICATION(S)

This application claims the benefit and priority of U.S. Provisional Patent Application Ser. No. 62/858,519, filed Jun. 7, 2019, the entire contents of which is hereby incorporated by reference.

TECHNICAL FIELD

This disclosure generally relates to the field of communication, and in particular relates to monitoring, commissioning and control of sensor equipment, such as light fixtures, including bulk data transfer to such devices, e.g., for updating an executable image, loading configuration information, etc.

SUMMARY

In one aspect, a method for transferring a data file to multiple remote devices is presented. The method includes the following steps. Packetizing the data file into a stream of packets. Using a first thread of execution to send the stream of packets to a first device of the multiple remote devices. Using a second thread of execution to send the stream of packets to a second device of the multiple remote devices concurrent to using the first thread of execution.

In another aspect a server for transferring a data file to multiple remote devices is presented. The server includes one or more processors. The one or more processors are used for performing the following steps. Packetizing the data file into a stream of packets. Using a first thread of execution to send the stream of packets to a first device of the multiple remote devices. Using a second thread of execution to send the stream of packets to a second device of the multiple remote devices concurrent to using the first thread of execution.

The above embodiments are exemplary only. Other embodiments are within the scope of the disclosed subject matter.

BRIEF DESCRIPTION OF THE SEVERAL VIEWS OF THE DRAWINGS

Example embodiments are illustrated by way of example and not limitation in the figures of accompanying drawings, in which.

Many aspects of the invention can be better understood with reference to the above drawings. The elements and features shown in the drawings are not to scale, emphasis instead being placed upon clearly illustrating the principles of example embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DESCRIPTION

Facilities, such as buildings, may have complex lighting systems that are used to both provide light and to monitor and manage nearby devices. Because of the complexity of these systems, including the sheer volume of devices involved, commissioning and management of the installations becomes quite challenging. The Wireless Highway Addressable Remote Transducer (HART) Protocol was introduced to allow low-power, low-complexity sensors and other such devices to communicate sensor information. However, numerous challenges have arisen when using Wireless HART protocol to manage large scale installations. For example, using the conventional techniques offered by the protocol for Wireless HART bulk data transfer involves using the Wireless HART broadcast mechanism to transmit data, because basic unicast mechanism is slow and time consuming for bulk data transfer. But the provided broadcast mechanism is unreliable since no response is received from the target remote device. Also, the broadcast mechanism is not supported by certain Wireless HART gateways and/or devices. Thus, this mechanism is not interoperable with the widest array of Wireless HART powered devices.

Disadvantageously, Wireless HART protocol was never intended to support near-simultaneous executable file image upload to numerous devices, thus making an upgrade of an installation rather time consuming and difficult. In a situation where devices have been installed throughout a large facility, it is simply infeasible to service each of the devices through a direct serial port for upgrade, but using Wireless HART to do such a large scale upgrade is also not feasible due to the limitations inherent in the speed and reliability of its data transferring mechanisms, because broadcast mechanisms often fail to include error correction.

Applicant has discovered an enhanced technique for bulk data transfer that advantageously allows for error correction and permits a significant speed increase when transferring data files to multiple remote devices. This new technique overcomes the limitations of conventional techniques by using unicast mechanisms in Wireless HART in an unexpected manner to achieve a practical solution that achieves the goal of a much faster bulk data transfer time with reliability.

Figure 1:
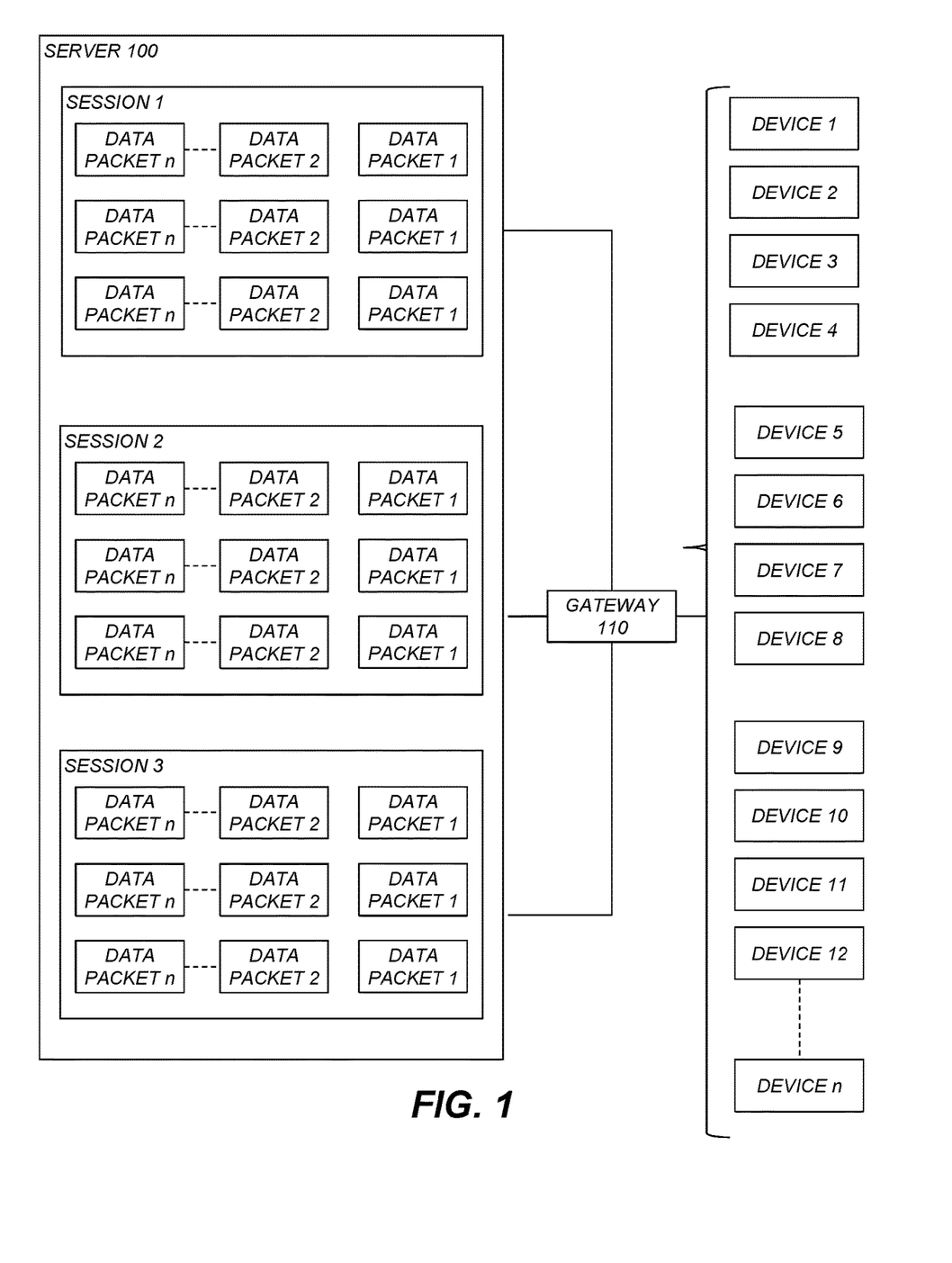
FIG. 1 depicts a system in which a data file is transferred to multiple remote devices by a server, according to one or more aspects of the present disclosure.

FIG. 1 depicts a server 100 that may be used for bulk data transfer to numerous remote devices, such as devices 1-12. In one example, server 100 may be a separate computer system. In another embodiment, server 100 may be a computer system that is also used for monitoring, managing, commissioning, or provisioning the multiple remote devices 1-12. In addition, the technique set forth herein may be used with dozens, hundreds, or thousands of remote devices.

As depicted in FIG. 1, the server 100 communicates to the devices through a gateway 110. The gateway may be any commercially available Wireless HART gateway. Conversely, the gateway function itself may be subsumed as software running in server 100.

In operation, when performing a bulk data transfer, such as the transfer of a new executable image to the remote devices, the server 100 provisions numerous threads of execution, denoted here as sessions 1-3. For instance, each session may be composed of one thread of execution. As another example, the system could include four threads per session, and one thread per device. The server 100 then assigns each of the remote devices to one of the sessions for servicing. The data file to be transferred is then packetized into n data packets, denoted as data packets 1, 2, ..., n. As explained in detail below, the packetization step may be conducted previously so that it does not need to be performed each time.

As indicated in FIG. 1, each of the sessions 1-3 manages sending of the data packets 1-n to four different devices, e.g., devices 1-4, devices 5-8, or devices 9-12. In another example, each session may be used to perform bulk data transfer to a certain number of devices, and as each bulk data transfer completes, a new device may be assigned to the session for sending the file. This and other load balancing schemes may be used so that each session is performing roughly the same amount of work. In addition, the number of sockets used by the server 100 can be optimized for network traffic. For example, sessions may each have their own sockets, and every new session includes a new socket. In another example, a second server may be employed, which would be responsible for servicing other remote devices. In such a case, the second server may or may not use the same gateway as the first server, depending on the load characteristics, the effective throughput, and the number of devices. In such a case, in a deployment with hundreds or thousands of remote devices, multiple servers or a single server with multiple gateways, or other such combinations may be determined to be faster for achieving the result of bulk data transfer to all the remote devices.

In another example, the system shown in FIG. 1 may be used to send two, three, or more different data files to different groups of the multiple remote devices at the same time. For example, there may be 100 each of 5 different types of remote devices that each require their own separate data file for an image upgrade, and the system described herein could readily handle that circumstance. In such a case, each data file may be separately packetized by the system so that the different data packets may be sent.

Notably, the system described above allows for sending data packets in a reliable transfer mode so that acknowledgements of receipt of the data packets are waited for by the thread(s) in the session(s) before sending the next packet; or the packets are continually sent and upon receipt of a packet failure, only that packet is retransmitted.

Figure 2:
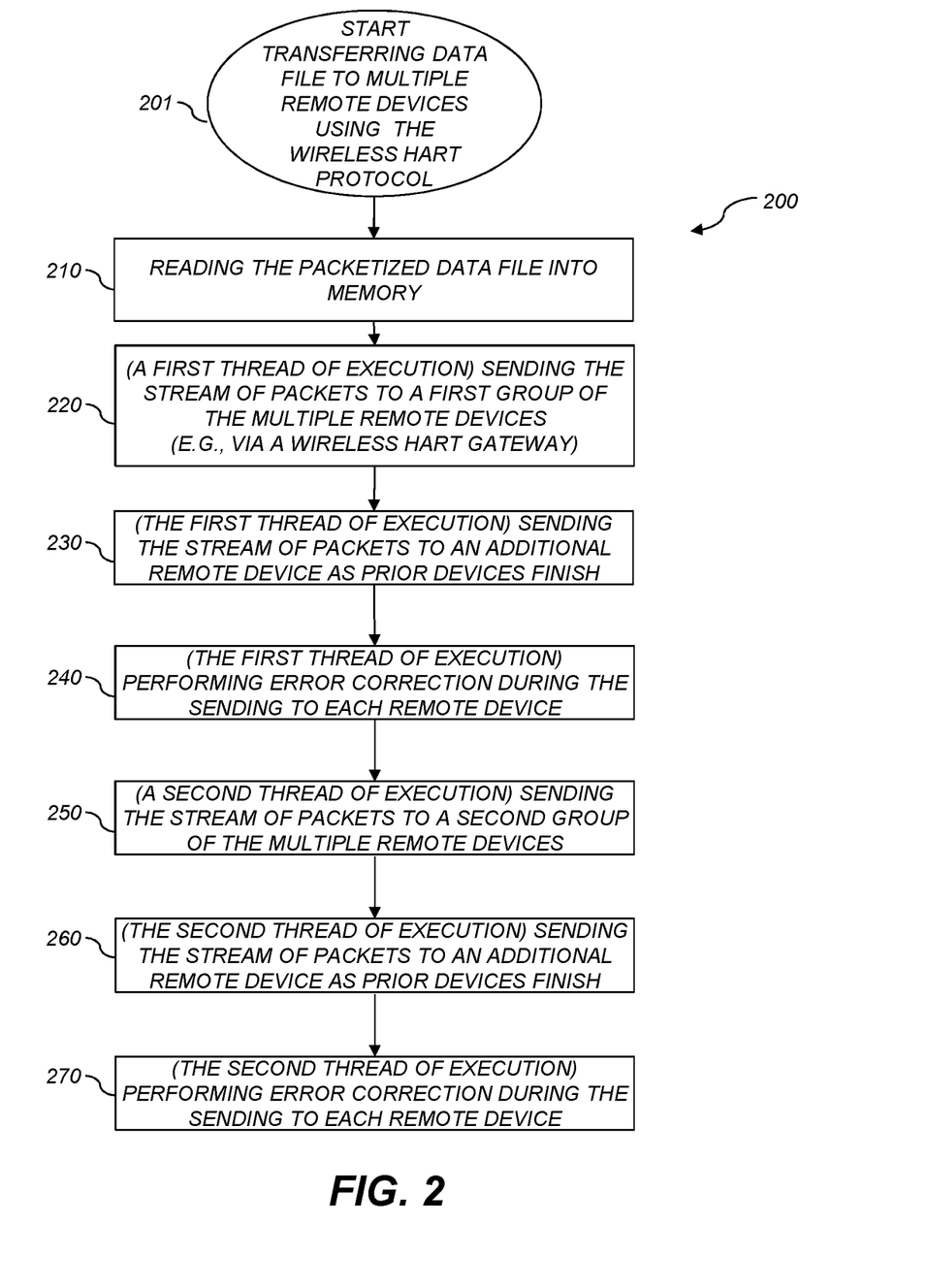
FIGS. 2-3 are flow charts depicting embodiments of a method for bulk data transfer to multiple remote devices using the Wireless HART protocol, according to one or more aspects of the present disclosure.

By way of example, FIG. 2 is a flowchart depicting an exemplary method 200 for monitoring or diagnosing equipment. In an embodiment, the method 200 at block 201 (operating on server 100 of FIG. 1) starts transferring a data file to multiple remote devices.

The method 200 at block 210 performs the step of reading the packetized data file into memory. In one example, packetizing may be done offline. For instance, the file to be transferred will be packetized and encrypted into a new file, e.g., a codepack file. Subsequently, a service engineer may deploy the file safely to remote locations without any threat of malicious activity. Advantageously, pre-packetizing offline eliminates the need for the runtime threads and functionality to create packets, as the sessions would just need to pick or read these already available packets from the offline created file. As a benefit, this will speed up the data transfer mechanism, especially in a case where the same file is transferred to numerous devices.

The method 200 at block 220 performs the step of using a first thread of execution to send the stream of packets to a first device. For example, multiple groups may be used, having or servicing, e.g., 4 devices per group. Each device in group will be handled by a separate thread. As a specific example, if there are 10 groups, with 4 devices per group, 40 threads would be created. In addition, once data transfer is completely done for a particular device, the thread can be reused for a new device still remaining in list of available devices. In such a case, the group will have always 4 devices actively handled. In another example, the method 200 at block 220 also employs a retransmit mechanism to receive acknowledgement of packet receipt from the remote device, and absent such acknowledgement, retransmit the data.

The method 200 at block 230 performs the step of using the first thread of execution to send the stream of packets to another of the multiple remote devices subsequent to one of the first device of the multiple remote devices receiving the data file. At block 240, the method 200 includes performing error correction during the sending to each remote device. The method 200 at block 240 performs the step of receiving acknowledgements from at least one of the first device of the multiple remote devices and retransmitting at least one of the packets in response to a send failure.

The method 200 at block 250 performs the step of using a second thread of execution to send the stream of packets to a second device. For example, a second device will have its own 4 threads, with the groups corresponding to sessions. In such an example, each group or session will have only one dedicated socket connection with a remote Wireless HART gateway. For 40 devices, and assuming that there are be 4 devices in each group/session, this example has 10 active sessions. In another example, the number of sessions possible is adjusted to match the capability of the number of sessions supported by the particular wireless HART gateway. The algorithm would adjust itself based on the possible number of sessions/groups supported by each such gateway.

The method 200 at block 260 performs the step of using the second thread of execution to send the stream of packets to another of the multiple remote devices subsequent to one of the second device of the multiple remote devices receiving the data file. At block 270, the method 200 includes performing error correction during the sending to each remote device. The method 200 at block 270 performs the step of receiving acknowledgements from at least one of the second device of the multiple remote devices and retransmitting at least one of the packets in response to a send failure.

In one embodiment, the method 200 includes upgrading the multiple remote devices with an executable image stored in the data file. In another embodiment, the first thread of execution uses one data socket to send the stream of packets to the first device of the multiple remote devices. In a further embodiment, the first thread of execution and the second thread of execution share a data socket to send the stream of packets.

In one implementation, the stream of packets is sent to the multiple remote devices via a gateway device. In another implementation, using the first thread of execution comprises receiving acknowledgements from at least one of the first device of the multiple remote devices and retransmitting at least one of the packets in response to a send failure. In another implementation, the method 200 further includes the step of using the first thread of execution to send the stream of packets to another of the multiple remote devices subsequent to one of the first device of the multiple remote devices receiving the data file. In a further implementation, the stream of packets comprises a stream of packets formatted for a Wireless Highway Addressable Remote Transducer (Wireless HART) Protocol, and the sending comprises using the Wireless HART Protocol to send the packets.

Figure 3:
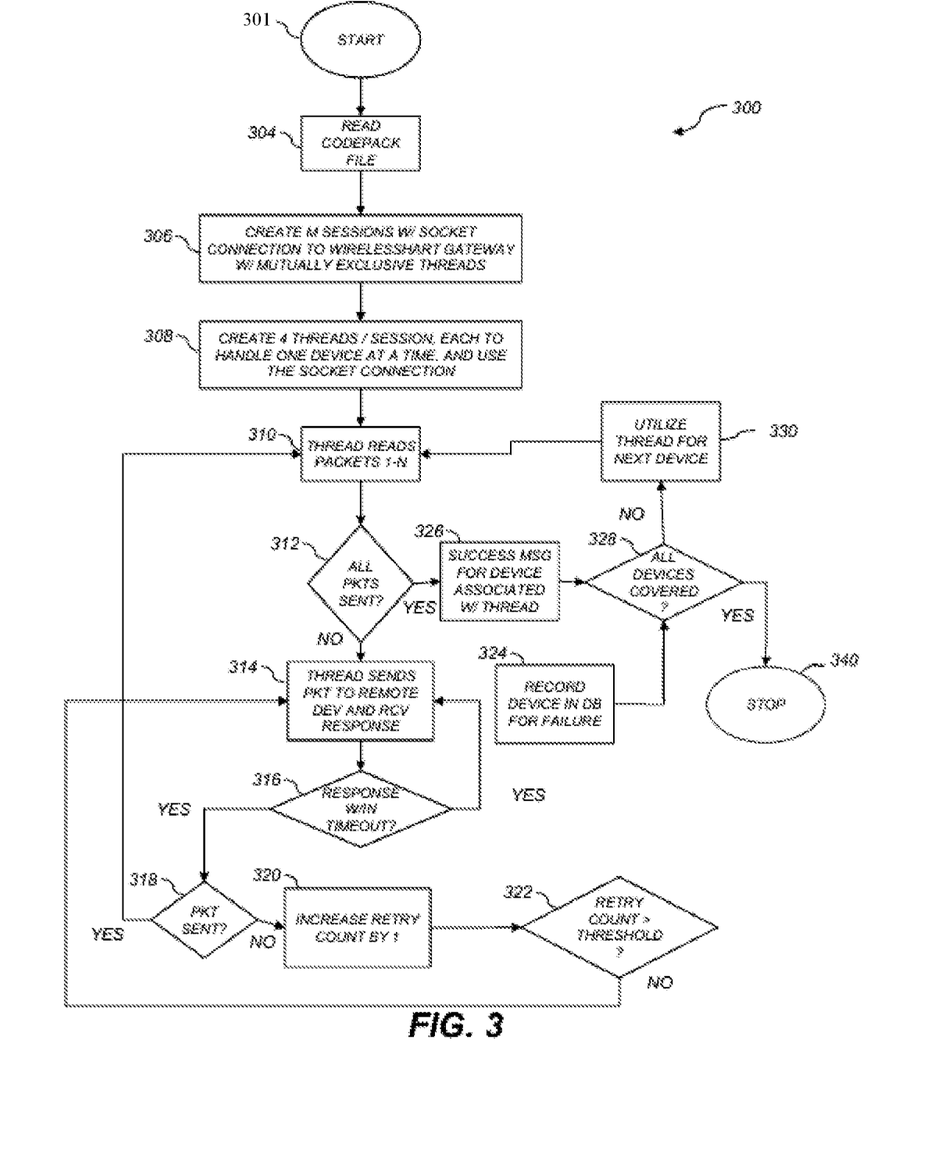

A further detailed flowchart of an embodiment of a method 300 for sending data to multiple devices is depicted in FIG. 3. Any of the implementation details discussed with respect to method 200 of FIG. 2 also may be applied to the method 300. Thus, the method 300 shall now be discussed without repeating those details. In the embodiment of FIG. 3, the method 300 at block 301 starts. Note that a codepack file containing one or more pre-packetized files for transfer (as discussed with respect to FIG. 2) may be prepared in a so-called offline manner (e.g., not as part of the process shown in FIG. 3, in order to reduce the processing required in the method 300). Next, the method 300 at block 304 reads the codepack file having the packets, e.g., the stream of packets that will be sent. Next, the method 300 at block 306 creates M sessions, each with a socket connection a Wireless HART gateway (e.g., gateway 110 of FIG. 1 may be a Wireless HART gateway) with mutually exclusive threads. Next, the method 300 at block 308 creates four threads for one session, each of which will handle one device at a time. These four threads, in this example, will use the socket connection.

Next, the method 300 will execute blocks 310-330 for each of the threads for updating each remote device serviced by that thread. Specifically, the method 300 at block 310 reads the packets from 1 to n. Next, the method 300 at block 312 checks to see if all the packets have been sent. If not, the method 300 at block 314 will send a packet to the remote device and receive a response/acknowledgement. Next, the method 300 at block 316 will check to see if any response is received within a timeout. If yes, the method 300 at block 318 will check to see if the packet has been sent successfully. If yes, the method 300 at block 318 will return to block 310 to send the next packet from 1 to n. If no, the method 300 at block 320 will increase the retry count by one. Next, the method 300 at block 322 will check to see if the retry count is greater than the threshold. If not, the method 300 will return to block 314 to send the packet again. If yes, the method 300 at block 324 will record the device as having failed, for example, in a database of failed devices.

Once the method 300 at block 312 determines that all packets are sent, the method 300 at block 326 will give a success message for the device associated with the thread. Next, the method 300 at block 328 will check to see if all devices have been sent the file or have been covered by the process. If not all the devices have been covered, the method 300 at block 330 will utilize the thread for the next device, starting again at block 310. If all the devices assigned to this thread for data transfer are completed, the method 300 at block 340 will stop.

As noted above, the techniques set forth above allow for numerous light fixtures or other devices to be managed in a manner that allows for firmware updates or other data to be sent to the devices while optimizing the use of network resources. Thus, the techniques represent an improvement to the computer technologies of computer networking, including a higher capacity router or switch for managing multiple remote devices.

Figure 4:
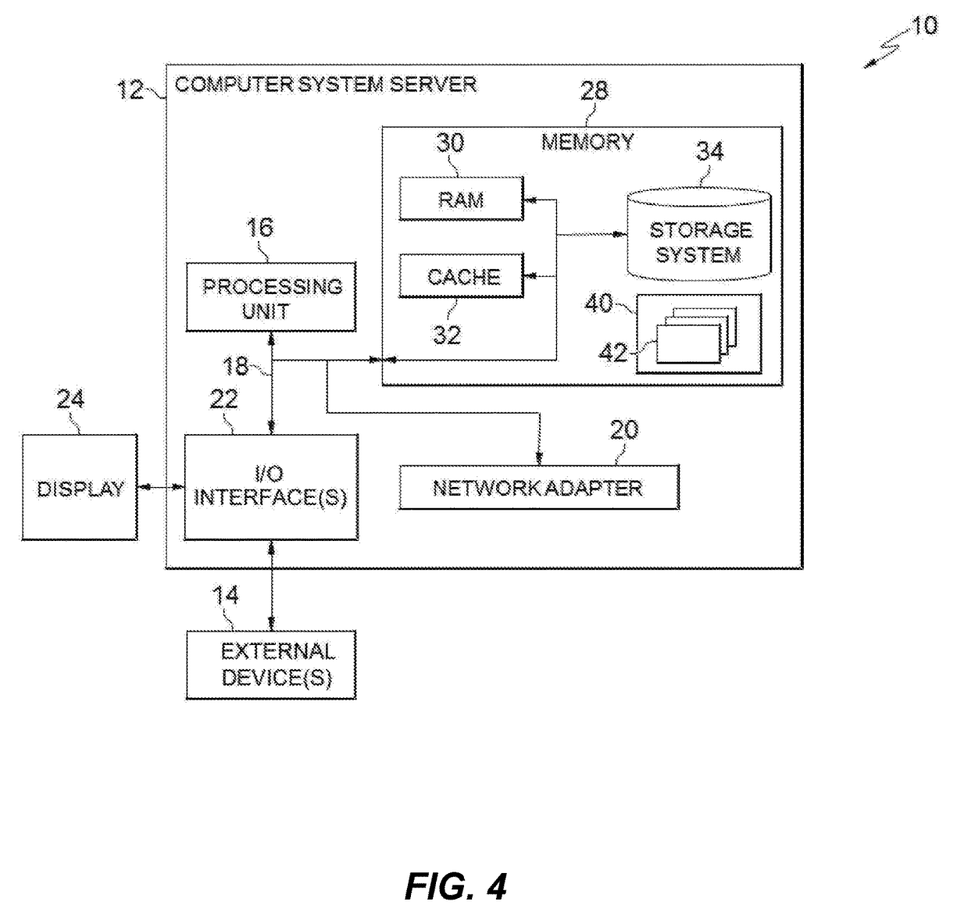
FIG. 4 is a block diagram of a computer system, such as that employed by the server of FIG. 1, according to one or more aspects of the present disclosure.

FIG. 4 is a block diagram of a computer system 10, such as that employed by sever 100 of FIG. 1. A computer system/server 12 may be described in the general context of computer system-executable instructions, such as program modules, being executed by a computer system. Generally, program modules may include routines, programs, objects, components, logic, data structures, and so on that perform tasks or implement particular abstract data types. Computer system/server 12 may be practiced in distributed environments where tasks are performed by remote processing devices that are linked through a communications network. In a distributed environment, program modules may be located in both local and remote computer system storage media including memory storage devices.

Computer system/server 12 in computer system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Indeed, the generically defined devices 14 of FIG. 4 could include the gateway 100 positioned in front of the devices 1-*n* of FIG. 1. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments may include a system, a method, and/or a computer program product. The computer program product may include a computer readable storage medium (or media) having computer readable program instructions thereon for causing a processor to carry out aspects of set forth herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the certain embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects set forth herein.

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the example embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A method for transferring a data file to multiple remote devices using a server and a gateway device, the method comprising:
    reading, on the server, a packetized data file having a stream of packets;
    using a first thread of execution to send the stream of packets to a first device of the multiple remote devices, the first thread of execution performing error correction during the sending of the stream of packets to the first device; and
    using a second thread of execution to send the stream of packets to a second device of the multiple remote devices concurrent to using the first thread of execution, the second thread of execution performing error correction during the sending of the stream of packets to the second device;
    wherein the method comprises upgrading the multiple remote devices with an executable image stored in the data file,
    wherein the stream of packets is sent to each of the first and second devices of the multiple remote devices via the gateway device, and
    wherein the gateway device communicates with the server using a first protocol and communicates with the first and second devices using a Wireless Highway Addressable Remote Transducer (Wireless HART) protocol.

2. The method of claim 1, wherein the first thread of execution uses one data socket to send the stream of packets to the first device of the multiple remote devices.

3. The method of claim 1, wherein the first thread of execution and the second thread of execution share a data socket to send the stream of packets.

4. The method of claim 1, wherein using the first thread of execution comprises receiving acknowledgements from at least one of the first device of the multiple remote devices and retransmitting at least one packet of the stream of packets in response to a send failure.

5. The method of claim 1, further comprising using the first thread of execution to send the stream of packets to another of the multiple remote devices subsequent to the first device of the multiple remote devices receiving the data file.

6. The method of claim 1, wherein the stream of packets comprises a stream of packets formatted for the Wireless HART Protocol, wherein the Wireless HART Protocol is used by the gateway device to send the packets to each of the first and second devices of the multiple remote devices.

7. A server for transferring a data file to multiple remote devices using a gateway device, the server comprising one or more processors for:
    reading a packetized data file having a stream of packets;
    using a first thread of execution to send the stream of packets to a first device of the multiple remote devices, the first thread of execution performing error correction during the sending of the stream of packets to the first device; and
    using a second thread of execution to send the stream of packets to a second device of the multiple remote devices concurrent to using the first thread of execution, the second thread of execution performing error correction during the sending of the stream of packets to the second device,
    wherein the data file comprises an executable image stored for upgrading the multiple remote devices,
    wherein the stream of packets is sent to the multiple remote devices via the gateway device, and
    wherein the gateway device communicates with the server using a first protocol and communicates with the first and second devices using a Wireless Highway Addressable Remote Transducer (Wireless HART) protocol.

8. The server of claim 7, wherein the first thread of execution uses one data socket to send the stream of packets to the first device of the multiple remote devices.

9. The server of claim 7, wherein the first thread of execution and the second thread of execution share a data socket to send the stream of packets.

10. The server of claim 7, wherein the first thread of execution receives acknowledgements from at least one of the first device of the multiple remote devices and retransmits at least one packet of the stream of packets in response to a send failure.

11. The server of claim 7, further comprising using the first thread of execution to send the stream of packets to another of the multiple remote devices subsequent to the first device of the multiple remote devices receiving the data file.

12. The server of claim 7, wherein the stream of packets comprises a stream of packets formatted for the Wireless HART Protocol, wherein the Wireless HART Protocol is used by the gateway device to send the packets to each of the first and second devices of the multiple remote devices.

13. A method for transferring a data file to multiple remote devices using a server and a gateway device, the method comprising:
    segmenting, on the server, a data file into data packets to produce a packetized data file having a stream of packets;
    reading the packetized data file;
    using a first thread of execution to send the stream of packets to a first device of the multiple remote devices via the gateway device, the first thread of execution performing error correction during the sending of the stream of packets to the first device; and
    using a second thread of execution to send the stream of packets to a second device of the multiple remote devices via the gateway device concurrent to using the first thread of execution, the second thread of execution performing error correction during the sending of the stream of packets to the second device,
    wherein the packetized data file is sent in a reliable transfer mode by acknowledging receipt of one data packet in a session before sending a next packet, and
    wherein the gateway device communicates with the server using a first protocol and communicates with the first and second devices using a Wireless Highway Addressable Remote Transducer (Wireless HART) protocol.

14. The method of claim 13, wherein the data packets are continually sent and upon receipt of a packet failure, and wherein only a failed data packet is retransmitted.

15. The method of claim 13, wherein the method comprises upgrading the multiple remote devices with an executable image stored in the data file and wherein the stream of packets is sent to each of the first and second devices of the multiple remote devices via a gateway device.

16. The method of claim 13, wherein the first thread of execution uses one data socket to send the stream of packets to the first device of the multiple remote devices.

17. The method of claim 13, wherein the first thread of execution and the second thread of execution share a data socket to send the stream of packets.

18. The method of claim 13, wherein using the first thread of execution comprises receiving acknowledgements from at least one of the first device of the multiple remote devices and retransmitting at least one packet of the stream of packets in response to a send failure.

19. The method of claim 13, further comprising using the first thread of execution to send the stream of packets to another of the multiple remote devices subsequent to the first device of the multiple remote devices receiving the data file.

20. The method of claim 13, wherein the stream of packets comprises a stream of packets formatted for the Wireless HART Protocol, wherein the Wireless HART Protocol is used by the gateway device to send the packets to each of the first and second devices of the multiple remote devices.

21. The method of claim 13, wherein the data file is pre-packetized offline to eliminate the need for runtime threads and increase data transfer speed.

* * * * *